United States Patent Office 3,555,470
Patented Jan. 12, 1971

3,555,470
DAMPING DEVICE IN ELECTRIC SWITCHES
Rolf Johansson, Skarholmen, Sweden, assignor to U.S. Philips Corporation, New York, N.Y., a corporation of Delaware
Filed Feb. 4, 1969, Ser. No. 796,411
Claims priority, application Sweden, Feb. 16, 1968, 2,080/68
Int. Cl. H01h 51/08
U.S. Cl. 335—138                                    6 Claims

ABSTRACT OF THE DISCLOSURE

A device for the high speed actuation of electrical switches by releasing an energy absorbing spring from a bowed position to engage a rotatable abutment during the stepping operation and using a spring loaded cylindrical follower in a square guide having corners located at predetermined angular positions to lock the switch after the stepping operation has been complete.

---

The invention refers to a device in electric switches, in particular high frequency switches, comprising a rotor which is rotatably journalled in a stator portion and stepped forward between different to one of a number of predetermined angular positions defined by a mechanic arresting device, the driving being effected by a stepping mechanism, such as a stepping magnet, which after each stepping action returns to a rest position. A difficulty in such switches is that the rotor to be stepped forward usually has a relatively large mass and that the switching of this should be rapid. For examples, in high frequency switches it is further a requirement that the angular position assumed by the rotor after the stepwise driving very accurately coincides with the given predetermined angular position. In order that the requirement on rapid switching shall be fulfilled it is necessary that the rotor when it has come to its final position is effectively stopped and possible vibrations are rapidly suppressed.

The purpose of the invention is to solve these problems for enabling rapid switching of the rotor without sacrificing the accurate angular setting and without need for increasing the dimensions of the angular adjustment device or the stepping mechanism.

According to the invention this is achieved thereby that between the rotor and the stator is arranged a stop and damping device influencing the rotor and controlled by the stepping mechanism, which device comprises two cooperating parts at least one rotatable abutment and a stationary abutment connected with the rotor and stator, respectively, which abutments cooperate at the end of each step to rapidly stop the rotor under absorption of the inertial forces and damping of possible vibrations, said abutments being disengaged from each other by the stepping mechanism at its return to its rest position so as to allow adjustment of the rotor by the arresting device. The rotor will hereby be quite free from the stop and damping device in stationary condition when the stepping mechanism is in its rest position, while the device is effective for stopping and damping the rotor during the switching operation when the stepping mechanism has left the rest position and not yet returned to the same.

The invention is illustrated in the accompanying drawings, in which

Figure 1:
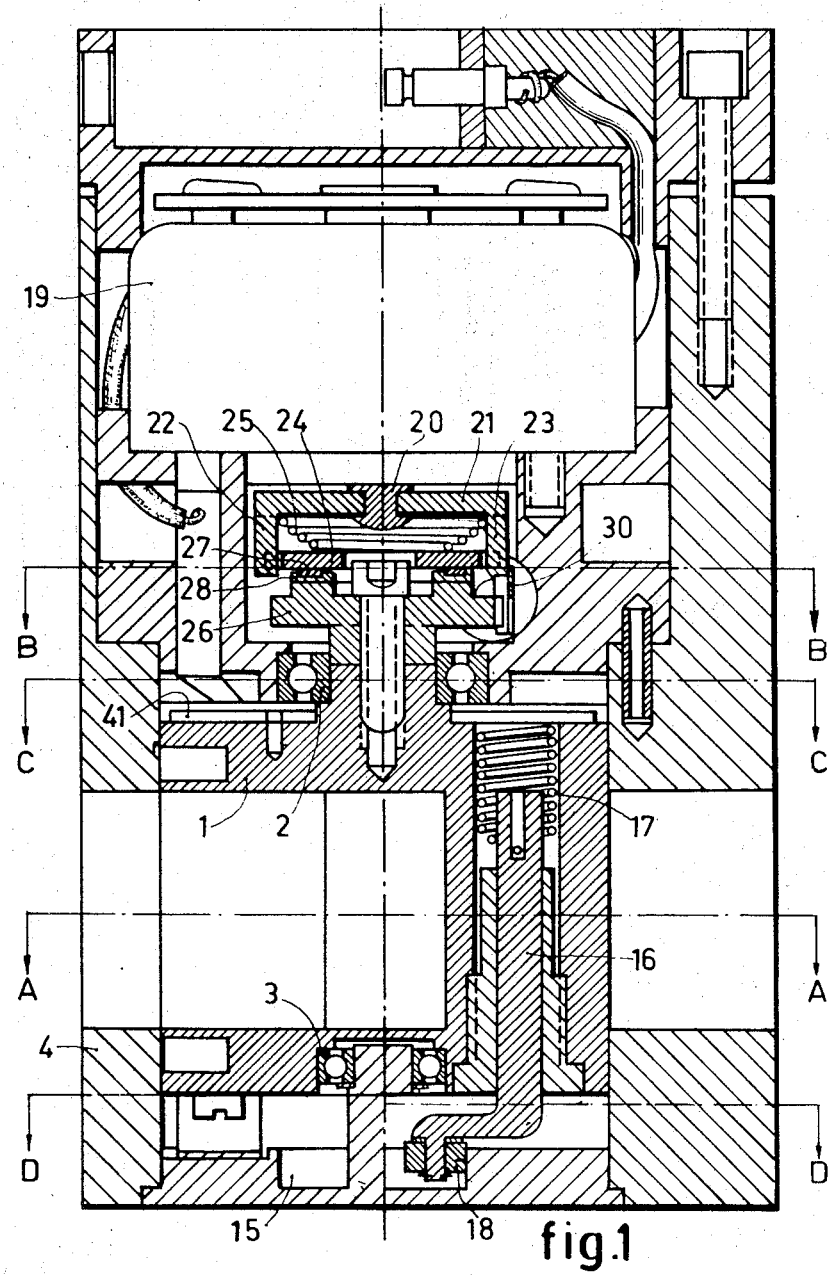
FIG. 1 shows a longitudinal sectional view along the line I—I in FIG. 2 through a high frequency switch with a stop and damping device according to the invention.
Figure 2:
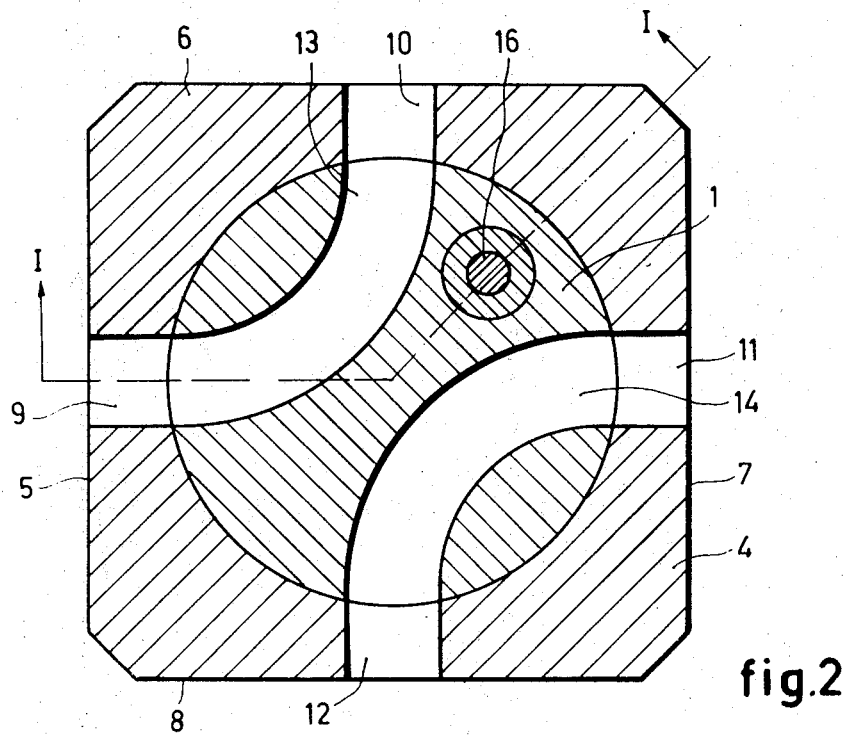
FIGS. 2–5 show different transversal sectional views through the switch.

The switch consists in principle of a cylindric rotor 1 which by means of bearings 2, 3 is rotatably journalled in a stator 4. In each one of the walls 5–8 of the stator 4 there are wave guide channels 9–12 adapted to be connected to rectangular outer wave guides. The channels 13, 14 extend through the rotor, which channels are adapted to the said wave guide channels in the stator and shaped such that they together with these channels will form a continuous wave guide between the wave guide outputs of two adjacent side walls. In the shown position thus the channels 9 and 10 and the channels 11 and 12 are connected to each other via the rotor. In its second operation position, which is obtained by rotation of the rotor 90° from the shown position, instead the channels 9 and 12 and the channels 10 and 11 are connected to each other via the rotor.

The operation positions are determined by a mechanic arresting or locking device consisting of a square guidance groove 15 arranged in the bottom of the envelope and a guidance arm 16 cooperating with the groove and rotatably mounted in the rotor. The arm 16 is by means of a spring 17 prestressed with a counter clockwise torque and at the bottom provided with a guidance pulley 18, which runs in the said groove 15. The prestressed arm 16 rotates the rotor until the pulley 18 bears against two adjacent sides of the square groove and will thereafter keep the rotor in this position. After a rotation of the rotor more than 45° from the shown position the pulley will run into the next "corner" of the guidance groove. The locking device will position the rotor without play with good reproducability in the predetermined positions defined by the guidance groove. The rotor is driven in steps of 90° in one and the same direction, in the given example in clockwise direction. The driving is effected by means of a stepping magnet 19, which is activated by a manual switch and deactivated automatically in a manner more closely described in the following. The stepping magnet is provided with a return spring so that after the stepping action it automatically returns to its initial position.

The stepping magnet 19 is connected to the rotor 1 in the following manner.

The output shaft 20 of the magnet is fixed to a disk 21 which is provided with two diametrically arranged, axially extending pins 22, 23. These pins engage recesses in a driving coupling disk 24, which follows the output shaft of the stepping magnet in its back-and-forth movement. By means of a spring 25 acting between the disk 21 and the coupling disk 24 the said last disk is pressed against a second coupling disk 26, which is fixedly mounted on the rotor 1. The coupling disks 24 and 26 are on their sides facing each other provided with mutually engaging projections and recesses 27, 28. These are shaped such that the disk 24 is in driving connection with the disk 26 when rotated in clockwise direction, while the disks are free from each other when the disk 24 is rotated in counter clockwise direction. The disk 26 and consequently the rotor will thus all the time be rotated in clockwise direction and will not follow the stepping magnet in its return motion (in principle a ratchet wheel).

Figure 3:
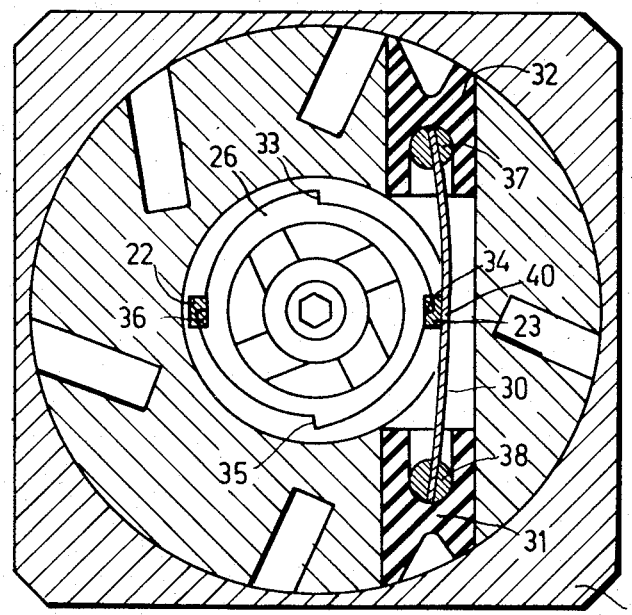
Figure 4:
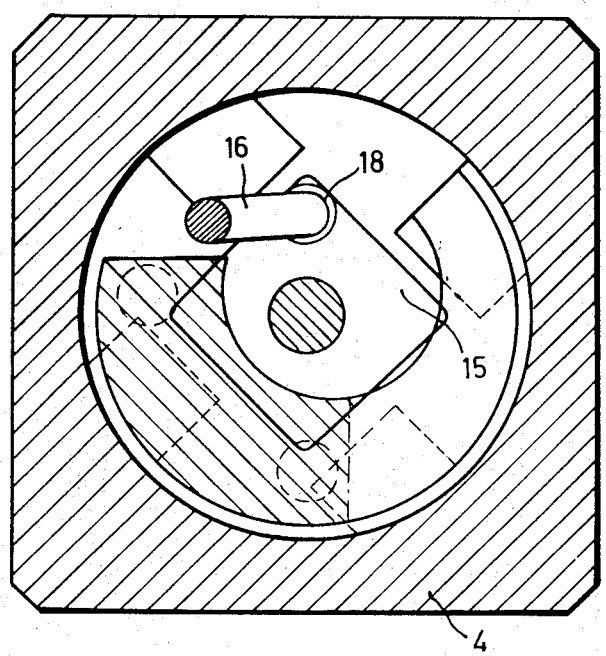
Figure 7:
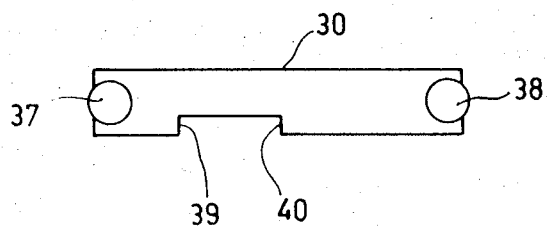

According to the invention there is a mechanic stop and damping device for the rotor, which consists of a flexible spring 30 (FIGS. 3 and 7) arranged between two elastic damping inserts 31, 32 and cooperating with abutment projections 33–36 on the coupling disk 26, which is fastened to the rotor. At the contact places between the spring 30 and the damping inserts 31, 32 there are rounded endpieces 37, 38, for example in the shape of rivet heads, for producing a better force distribution over the contact surface. The spring 30 has according to FIG. 7 a recess 39, into which the said projections 33–36 extend provided that the spring 30 according to the following is not bent outwardly. Under the same condition the projections 33–36 will abut against the edge 40 in certain angular positions of the rotor, which angular positions approximately coincide with the angular positions defined by the mechanic locking device.

In stationary condition of the rotor, which is shown on the drawings, the spirng 30 is bent outwardly so that it is free from the said projections on the disk 26. This is achieved thereby, that the pin 23 connected with the disk 21 bears against the upper portion of the spring and deflects the center portion of the spring where the stop surface 40 is situated. When the stepping magnet is excited the disk 21 with the pin 23 rotates in clockwise direction, whereby the pin 23 will leave the spring 30 so that the spring will return to its active position by its own resilience.

Figure 5:
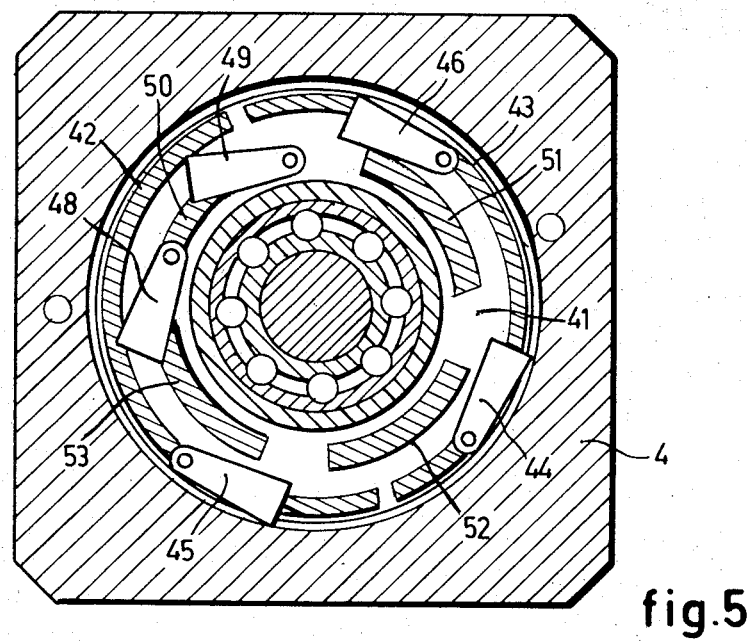

The current supply to the stepping magnet 19 takes place through a contact disk 41 (FIGS. 1 and 5) which is fastened to the rotor 1. The disk 41 is according to FIG. 5 provided with two semicircular contact plates 42, 43 which cooperate with the contact springs 44, 45, 46 mounted in the stator. The contact springs are placed such relative to the contact plates that the contact spring 44 in each first position of the rotor is connected with the contact spring 46 and in each second position with the contact spring 45. In the shown position spring 44 is connected with the spring 46 via the contact plate 43. In the next position achieved by rotation of the rotor with the contact disk an angle of 90°, the contact spring 44 will be connected to the spring 45 via the same contact plate. In the next following stationary position of the rotor the spring 44 will again be in contact with spring 46 via the contact plate 42, which now assumes the same position as the contact plate 43 in the shown example etc.

Figure 6:
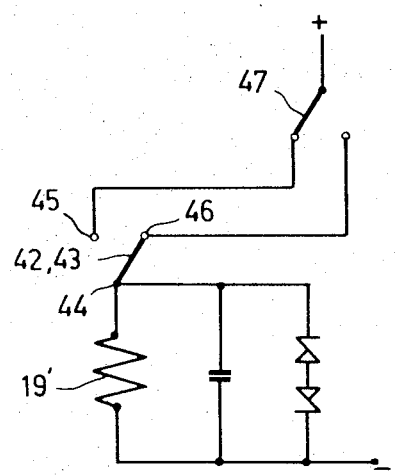
FIG. 6 shows the electric connection of a stepping magnet included in the switch and FIG. 7 shows a plan view of a damping spring included in the device.

The contact spring 44 is according to FIG. 6 connected to one terminal of winding 19' of the stepping magnet 19, while the contact springs 45, 46 are connected to the fixed terminals of a manual make-and brake switch 47. The movable contact of the switch 47 is connected to one pole of a voltage source and the opposite terminal of the winding 19' to the second pole of the source.

The contact plates 42, 43 and the contact springs 44–46 form a switch which produces automatic interruption of the current supply to the stepping magnet 19, which is initiated by actuation of the switch 47. Further there are arranged two contact springs 48, 49 cooperating with four contact plates 50–53. The contact springs 48, 49 are situated such relative to the contact plates 50–53 that current-conductive connection is produced between the springs only if the rotor has stopped in correct position. Should it, however, for any reason stop somewhere between the four possible stationary positions there will be no connection between the springs 48–49. The springs 48, 49 can be connected to a lamp or other indicating device, which indicates that the rotor is positioned correctly.

The function is as follows.

Starting in the stationary initial position shown in FIGS. 5 and 6 current will be applied to the stepping magnet winding 19' via the contact springs 44, 46 and the contact plate 43 upon actuation of the switch 47. The stepping magnet functions and rotates the rotor 1 in clockwise direction via the coupling disks 24, 26. During the first portion of the motion both the disk 21 with pins 22, 23 and the disks 24, 26 will take part in the rotation. After a small rotation the pin 23 will leave the spring 30 so that this will return to its effective position by its own resilience. After a rotation of the rotor of each 70° the spring 46 will leave the contact plate 43 and the connection between the springs 44, 46 is interrupted. The winding of the stepping magnet will be currentless. The rotor which has now obtained a high rotation speed continues the rotation by its own inertia. When it has rotated 90° the projection 33 (FIG. 3) will run against the edge 40 of the spring 30. The shock force is transmitted to the damping insert 31, which together with the insert 32 will take up the inertial power and produce rapid and effective damping of the rotor. Meanwhile the stepping magnet has started its return motion which is produced by a return spring not shown. The disk 21 with pin 23 takes part in the return motion. When the stepping magnet comes close to its rest position the pin 23 will again run against the spring 30 and will release the same from projection 33 of the disk 26. The rotor is now quite free from the damping device and is only activated by the prestressed arm 16, which by cooperation with the guidance groove 15 will adjust the rotor exactly to the predetermined angular position.

Upon renewed actuation of the switch 47 the process will be repeated.

What is claimed is:

1. A device in high frequency electric switches comprising a stator, a rotor rotatably journaled in said stator, driving means for stepping said rotor to predetermined angular positions, a plurality of arresting devices connected to said rotor for defining said predetermined angular positions, means for returning said driving means to a rest position after each stepping operation, stopping and damping means for rapidly stopping said rotor and absorbing the inertial forces thereof and for damping resulting vibrations after each stepping operation, said stopping and damping means comprising at least one rotatable abutment connected with said rotor and one stationary abutment connected with said stator, said rotatable and stationary abutments being actuated by said driving means to cooperate with each other at the end of each stepping operation, and means for disengaging said abutments from each other after said driving means has returned to said rest position.

2. The device according to claim 1 wherein said arresting means comprises a stator having a square guidance groove and a spring-loaded guidance arm extending into said groove for locking said rotor in the corners of said groove.

3. The device according to claim 1 wherein said stationary abutment comprises a flat flexible spring connected to said stator at its ends and having a surface cutout for mating with said rotatable abutment when said rotor reaches said predetermined angular position.

4. The device according to claim 3 wherein said flat flexible spring is connected to said stator through elastic material to dampen vibrations arising from said cooperation between said stationary and rotatable abutments.

5. The device according to claim 3 wherein said flexible spring is held away from and free of said rotatable abutment by said driving means whenever said driving means is at its rest position, and is released for returning to its cooperating position with said rotatable abutment by its own resilience at all other times.

6. The device according to claim 3 wherein said driving means comprises a stepping magnet connected with said rotor.

References Cited

UNITED STATES PATENTS 3,097,278 7/1963 Alderman _____ 335—139
3,447,106 5/1969 Jameel _____ 335—140

HAROLD BROOME, Primary Examiner